Oct. 29, 1935.   M. C. HUTTO   2,018,674
METAL CUTTING OR REAMING DEVICE
Filed March 9, 1932   3 Sheets-Sheet 2
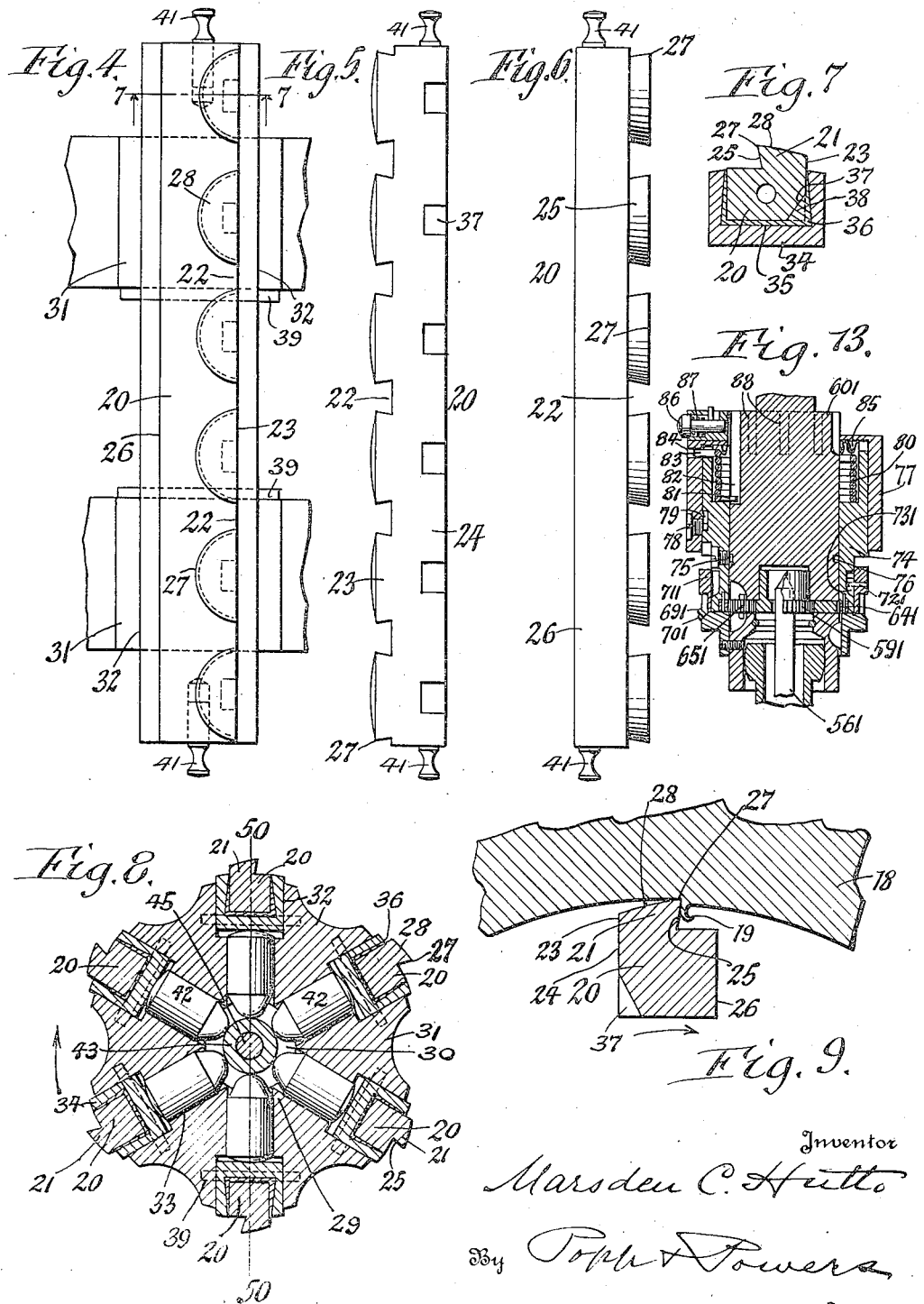

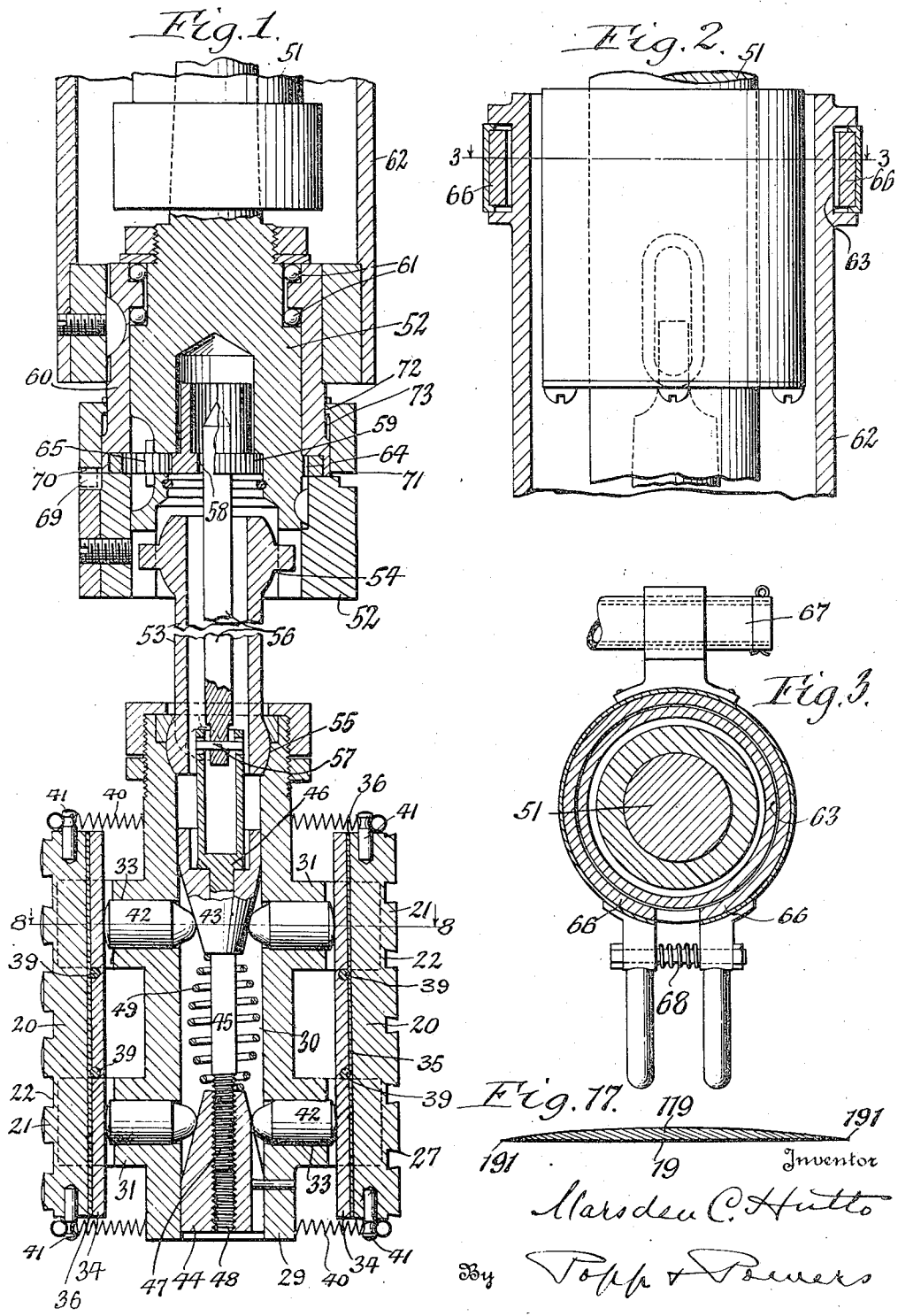

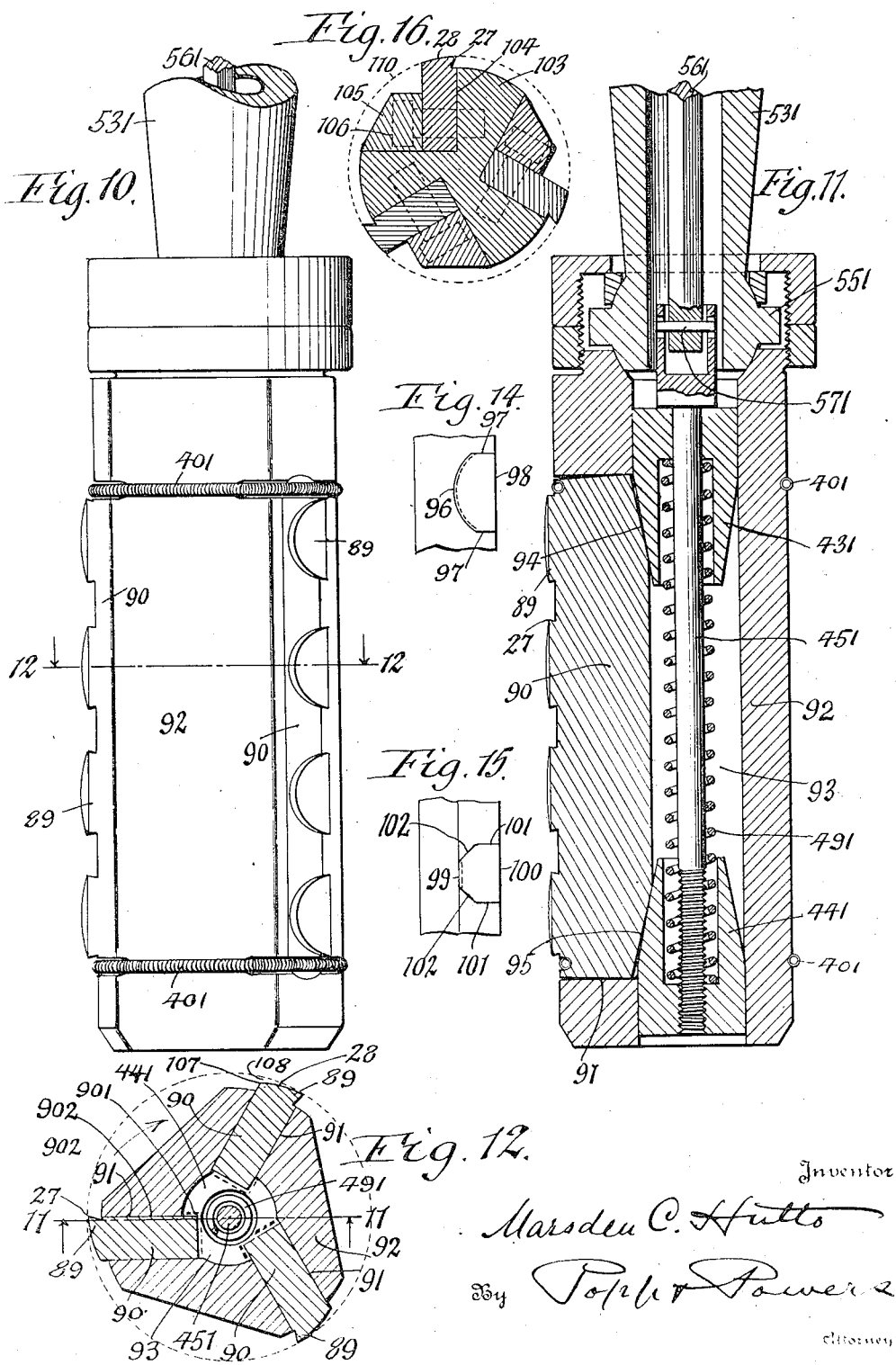

Patented Oct. 29, 1935

2,018,674

UNITED STATES PATENT OFFICE 2,018,674

METAL CUTTING OR REAMING DEVICE

Marsden C. Hutto, Detroit, Mich., assignor to Hutto Engineering Company, Inc., Detroit, Mich., a corporation of Michigan Application March 9, 1932, Serial No. 597,747

1 Claim. (Cl. 77—76)

This invention relates to a cutting device for removing stock from the bores of metal bodies and more particularly for removing excess stock from such bodies preparatory to finishing the bores of the same by honing or lapping.

One of the objects of this invention is the provision of a tool of this character which is simple in construction, efficient in operation and not liable to get out of order and which permits work of this character to be effected rapidly and economically.

Another object of this invention is to provide means for so operating this tool that the same reciprocates and rotates while at work and can be adjusted at will or automatically for taking up wear on the tool and compensate for removal of stock on the work piece, and the cutting operation may also be arrested at a predetermined limit for which the instrument has been set.

In the accompanying drawings:

Figure 1 is a vertical longitudinal section showing the cutter head of the cutting device and the lower part of the mechanism for driving the head and adjusting the working diameter of the same.

Figure 2 is a similar view showing the upper part of the mechanism for driving the cutter head and adjusting the working diameter of the same.

Figure 3 is a horizontal section on a reduced scale taken on line 3—3 Fig. 2.

Figure 4 is a face view of one of the bases provided with a plurality of cutting bits or blades embodying my invention and showing the same mounted on a holder which is guided on the head of the tool.

Figure 5 is a rear side view of this base and its bits.

Figure 6 is a front side view thereof.

Figure 7 is a cross section on line 7—7 Fig. 4.

Figure 8 is a cross section of the cutter head taken on line 8—8 Fig. 1.

Figure 9 is a fragmentary cross section of the single cutter bit constructed in accordance with my invention and showing the manner in which the same operates on a work piece.

Figure 10 is a side elevation of the cutter head showing a different manner of utilizing my improvements.

Figure 11 is a vertical longitudinal section of the same taken on line 11—11 Fig. 12.

Figure 12 is a cross section taken on line 12—12 Fig. 10.

Figure 13 is a fragmentary longitudinal section of a mechanism for driving the cutter head and automatically adjusting the working diameter of the cutter while the tool is in operation.

Figures 14 and 15 are fragmentary outer face views showing modified forms of the cutting bit embodying my invention.

Figure 16 is a transverse section of a fixture or holder adapted to hold one or more cutting bits while the cutting faces of the same are being ground preparatory to using the same in accordance with this invention.

Figure 17 is a cross section, on an enlarged scale of a chip or shaving cut by the tool.

In the following description similar characters of reference indicate like parts in the several figures of the drawings.

Referring to Figs. 1, 4-9, the numeral 20 represents a blade or base upon the outer face of which one or more cutting bits 21 are formed in accordance with this invention, six of such bits being showing for example, in Figs. 1, 4, 5 and 6, although this number may be varied as desired or required.

In the construction shown in these figures this base is made of tool steel in the form of an elongated block or bar which is substantially rectangular in cross section and each of the bits is formed integrally with the base on the outer face thereof.

Each of these bits has the form of a boss projecting outwardly from the outer face of the base and is spaced apart by intervening gaps 22 from adjacent bits when more than one is employed, as shown in Figs. 1, 4, 5 and 6. The general contour of each bit in its preferred form resembles that of a semi-cylinder the axis of which is at right angles to the plane of the outer face of the base and is provided with a flat rear side 23 which is preferably flush with the rear side 24 of the base and a curved front side 25 which sets back or is arranged at a distance rearwardly from the front side 26 of the base, as shown in Figs. 4–9. The front side 25 of each bit is undercut or recedes along its entire curvature from its top toward the bottom thereof and thereby produces a relatively sharp outer cutting edge 27 of convex semi-circular form along the curved front and lateral sides of the bit, as shown in Figs. 1 and 4-9. The outer face 28 of each bit gradually recedes inwardly from the foremost part of the cutting edge to the rearmost part of the same, as shown in Figs. 7, 8 and 9, this receding face being preferably curved about an axis which is eccentric to the axis of the rotary body on which the bit is mounted.

Upon rotating a base having one or more bits of this character about the axis of the cylindrical surface or bore of a work piece 18 which is to be operated upon and also reciprocating or traversing said parts one relative to the other lengthwise of said bore while the convex front cutting edges of the bit or bits are in engagement with the bore a thin shaving 19 of metal will be removed from the bore rapidly and with a clean cut and without unduly heating the instrument.

This cutting action is promoted by the undercut formation of the convex front or advancing side of each bit upon rotating the instrument and also due to the shearing action of each bit on the metal which occurs during the stroke of the instrument in both directions lengthwise of the bore of the work piece upon reciprocating the instrument relative to the latter. As the outer face of each bit recedes inwardly from the front part toward the back part of the same engagement of this face with the bore of the work piece is relieved during the cutting operation and undue wear and heating of the instrument is avoided, thereby reducing the cost of maintenance and economizing in the cost of doing work of this character.

Inasmuch as the cutting edge of each bit not only diverges from the foremost part of the same to opposite lateral sides of the bit but also is gradually nearer the axis of rotation from the front to the rear part of the cutting edge of the bit, a convex cutting edge is present crosswise of the line of movement to the surface to be cut, thereby cutting or gouging from the work piece a chip 19 which has a comparatively thick part 119 along its longitudinal center and gradually tapers transversely in opposite directions from the central thick part and forms thin longitudinal edges 191 on opposite sides of the central part of the chip as shown in Fig. 17.

Various means may be employed for supporting one or more cutting bits and imparting to the same a rotary and longitudinally reciprocating motion, the means shown in Figs. 1, 2, 3 and 8 being a suitable example and constructed as follows:—

The numeral 29 represents the body of a cutter head which is provided centrally with a longitudinal guide bore 30, and a plurality of pairs of laterally projecting guide lugs or bosses 31 each of which has a longitudinal guide recess 32 at its outer end and a radial guideway or opening 33 extending from the bore of the body to the bottom of the guide recess in the respective guide lug, as shown in Figs. 1 and 8.

In the guide recesses of each pair of guide lugs is arranged a holder 34 of channel form having a longitudinal channel 35 on its outer side in which the inner part of the base having a plurality of bits is secured by Babbitt solder, or sulphur or other self-hardening adhesive material 36. Longitudinal movement of the bit base in the holder is prevented by providing the rear side of the base with notches 37 into which some of the adhesive material flows and forms anchors 38 therein, as shown in Fig. 7, for interlocking the bit base and adhesive material and preventing longitudinal movement of the bit base in the holder. The holder and bits are capable of moving as a cutter unit in the guide recess of a pair of guide lugs 31 on the body but the same are held against longitudinal movement thereon by retaining pins 39 arranged transversely on the holder and engaging with the opposing sides of the pair of guide lugs, as shown in Fig. 4.

Means are provided for yieldingly drawing the cutter units inwardly for reducing the working diameter of the tool, this being preferably accomplished by two garter or circular springs 40 surrounding the body and engaging with fastening pins 41 at opposite ends of the cutter holders, as shown in Fig. 1. The means for moving the cutter units outwardly for increasing the working diameter of the tool or taking up for wear on the bits or removal of stock from the work piece comprise radially movable shifting pins 42 sliding in the guide openings 33 and engaging their outer ends with the inner side of the cutter holders, respectively, two opposed cones 43, 44 movable lengthwise in the bore of the body and having their like small ends facing each other, and each cone engaging the inner ends of the shifting pins which cooperate with one end of the several cutter units, an adjusting screw 45 passing through the upper cone 43 and provided with a head 46 engaging the upper side of the same and having a thread 47 at its lower end which works in a threaded opening 48 in the lower cone 44, and a spring 49 surrounding the adjusting screw and engaging its opposite ends with said cones, as shown in Fig. 1.

Upon turning the adjusting screw 45 in one direction so that the same enters the lower cone 44 to a greater extent then the two cones will be drawn together and cause the shifting pins 42 to move outwardly together with the cutter units supported by these pins and thereby increase the working diameter of the tool and adapt the bits thereof to the work piece as stock is removed from the latter and compensation for wear on the bits becomes necessary. Upon turning the adjusting screw 45 in the opposite direction the cones are separated by the spring 49 and the cutter units and shifting pins 42 are moved radially inward for contracting the working diameter of the tool by the springs 40. If the bore of the work piece which is being operated upon is not truly cylindrical but more or less conical in form then the cutter units will tilt the requisite extent to permit the bits thereof to bear against the working surface throughout the length of the unit. In doing this one end of each cutter unit will be moved inwardly more or less relative to its opposite end and thereby cause the shifting pins at one end of the body to ride down on the corresponding cone toward the small end thereof while the shifting pins at the opposite end of the body ride up on the other cone toward the large end thereof due to the wedging engagement between these pins and cones, whereby the cones and the parts connected therewith are shifted bodily or caused to float as a unit lengthwise of the cutter head as the cutter units automatically adapt themselves to the non-cylindrical form of the bore of the work piece.

As the cutting operation proceeds the bits gradually cut away the high parts of the working surface and gradually convert the same into cylindrical form and during this operation the cutter units are gradually moved into a position in which the bits are parallel with the axis of the tool, which position is reached and retained when the working surface is restored to cylindrical form.

In the preferred organization the cuter units are so mounted on the body of the tool that the foremost part of the front or cutting edge of each bit is arranged somewhat in front of a radial line 50—50, as shown in Fig. 8. By this means the bits are held more rigidly in their operative position and enable the same to better withstand the thrust which is exerted against the same while engaging the working surface and cutting chips or shavings of metal therefrom without undue tendency to tip the bits relatively to the holders of the cutter units and the body of the tool.

By undercutting the front side of each bit from its edge at its top rearwardly toward the root thereof, the bit is further maintained in its operative position and held against tipping rearwardly, thereby causing the bits to work more effectively and remove more stock within a given time and expenditure of power than otherwise would be the case.

If any looseness exists in the fit between the bit holder and the longitudinal surfaces of the guideways 32 the cutter unit as a whole will tip aft at its outer end as the front ends of the bits engage the working surface. When this occurs the front edges of the respective bits will turn about an axis located at the inner front corner of the respective bit holder and thereby cause the front edges of the bits to move rearwardly and inwardly toward a radial line drawn centrally through the cutter unit and take out any slack between the body and the bit holder. As a result the distance from the center of the tool body to the foremost part of the cutting edges of the respective bits is shortened to a small extent which permits bits to cut but prevents the same from digging into metal and hanging up the tool. If each bit were initially arranged on a radial line and so mounted on the body that respective holder would turn about an axis arranged at the inner rear corner of the holder, then the foremost part of the cutting edge of the bit would swing rearwardly and outwardly relative to the radial line through the bits and thereby lengthen the distance from the axis of the body and the front cutting edge of the bit and thereby produce an increase in the depth of cut and possibly tear the material, hang up the work, or wreck the tool.

As the shavings of metal are removed by the bits from the working surface the same pass through the clearance gaps between the several bits of each cutter unit, thereby avoiding clogging the latter and instead keeping the same free from chips and shavings and enabling the bits to operate most efficiently.

The cutter head may be operated from any suitable power source, for example, from a driving shaft 51 which has a rotary and a longitudinally reciprocating movement. The means shown in the drawings for connecting this cutter head with the driving shaft comprise a driven shaft having an upper intermediate driven shaft section 52 which is connected at its upper end with the lower end of the driving shaft, and a lower intermediate driven shaft section 53 which is connected at its upper end by a universal joint 54 with the lower end of the upper intermediate shaft section 52 while its lower end is connected by a universal joint 55 with the upper end of the body of the cutter head. By means of these universal joints the cutter head may be properly engaged with the work piece and operated therein notwithstanding that the work piece may be somewhat out of axial alinement with the driving shaft 51.

Means are provided whereby the cutter units may be adjusted either manually or semi-automatically for varying the working diameter of the tool, which means, as shown in Figs. 1, 2 and 3, may be constructed as follows:

As the shavings of metal are removed by the bits from the working surface the same pass through the clearance gaps between the several bits of each cutter unit, thereby avoiding clogging the latter and instead keeping the same free from chips and shavings and enabling the bits to operate most efficiently.

The cutter head may be operated from any suitable power source, for example, from a driving shaft 51 which has a rotary and a longitudinally reciprocating movement. The means shown in the drawings for connecting this cutter head with the driving shaft comprise a driven shaft having an upper intermediate driven shaft section 52 which is connected at its upper end with the lower end of the driving shaft, and a lower intermediate driven shaft section 53 which is connected at its upper end by a universal joint 54 with the lower end of the upper intermediate shaft section 52 while its lower end is connected by a universal joint 55 with the upper end of the body of the cutter head. By means of these universal joints the cutter head may be properly engaged with the work piece and operated therein notwithstanding that the work piece may be somewhat out of axial alinement with the driving shaft 51.

Means are provided whereby the cutter units may be adjusted either manually or semi-automatically for varying the working diameter of the tool which means as shown in Figs. 1, 2 and 3 may be constructed as follows:

The numeral 56 represents an adjusting shaft having its central part arranged within the lower intermediate shaft section 53 which is made hollow for this purpose while its lower end extends into the tubular upper end of the cutter head body and its upper end extends into the hollow lower end of the upper intermediate shaft section 52. At its lower end this adjusting shaft 56 is connected by a universal joint 57 with the upper end of the adjusting screw 45 and at its upper end this adjusting shaft is made square in cross section and passes loosely through a correspondingly shaped opening 58 formed in the bore of a driven gear wheel 59 which is journaled within the upper part of the central cavity in the upper intermediate shaft section so that in effect a universal joint is produced between this gear wheel and the adjusting shaft which permits of a limited angularity in the relative positions of the upper intermediate shaft section and the adjusting shaft without producing any cramping action and also permits the adjusting shaft to slide lengthwise in the driven gear wheel 59 but compels the latter and the adjusting shaft 56 to turn together.

Surrounding the upper intermediate shaft section 52 is a tubular adjusting member consisting preferably of a lower bearing sleeve 60 which is journaled by a ball bearing 61 on the exterior of the upper intermediate shaft section and an upper brake sleeve 62 which is connected at its lower end with the bearing sleeve and provided at its upper end with an external brake drum 63. On its lower part the bearing sleeve 60 is provided with an internal gear wheel or rim 64 and on the adjacent part of the upper intermediate shaft section 52 is journaled an idler gear pinion 65 which meshes with said gear rim 64 and also with said driven gear wheel 59. Upon turning said adjusting member 60, 62 by hand this motion is transmitted by the gearing 64, 65, 59 and adjusting shaft 56 to the adjusting screw 45 so that the working diameter of the cutter head may be either expanded or contracted.

If it is desired to enlarge the working diameter of the cutter head automatically while the same is in operation the tubular adjusting member 60, 62 is held against rotation whereby the gearing 64, 65, 59 will turn the adjusting shaft for actuating the screw 45 whereby the cones 43, 44 are shifted relatively to each other for expanding the cutter units and increasing the working diameter of the tool. The means for thus holding the tubular adjusting members may consist of two brake levers 66 which are mounted on a relatively stationary support 67 and are adapted to be pressed against opposite sides of the brake drum 63 by hand or otherwise for either retarding the rotation of the adjusting member 60, 62 or holding the same at rest. Normally the brake levers are held out of operative engagement with the brake drum 63 by a spring 68 interposed between the same.

Adjustable limiting means are provided whereby the expansion of the working diameter of the tool is arrested when the same reaches the diameter at which the limiting means have been set. The limiting means may consist of a relatively fixed stop 69 arranged on the lower section 60 of the tubular adjusting member and an adjustable stop 70 adapted to engage the fixed stop and arranged on a stop sleeve 71 which surrounds the bearing sleeve 60 and is provided with an annular row of internal locking teeth 72 which are adapted to engage with an annular row of locking teeth 73 on the periphery of the bearing sleeve 60. In using this expansion limiting device the operator raises the stop sleeve 71 sufficiently to disengage its teeth 72 from the teeth 73 on the bearing sleeve 60 and then turns the stop sleeve backwardly to space its stop 70 away from the stop 69 the required distance to suit the desired expansion limit of the cutter head and then the stop sleeve is again lowered for interlocking its teeth 72 with the teeth 73 of the bearing sleeve 60. Upon operating the adjusting mechanism of the tool either manually or automatically for expanding its working diameter such expansion will continue due to the relative change in position of the adjusting member and the intermediate shaft sections until the stop 72 and the stop sleeve engages with the stop 73 on the bearing sleeve 60 after which further expansion of the working diameter ceases and the cutter units will merely operate on the work piece until the bits have cut themselves free after which the cutter head will run idly until the expansion limiting means have been set for a new location.

If desired the cutter units may be expanded by means which operate wholly automatically after having been set manually for the purpose of increasing the working diameter of the tool as the removal of stock and any wear on the cutter progresses.

Means suitable for this purpose are shown in Fig. 13 and are constructed as follows:

The numeral 74 represents a take-up sleeve capable of rotation on the exterior of the upper intermediate driven shaft section 601 but held against lengthwise movement thereon by a screw 75 arranged on the sleeve and engaging with an annular groove 76 in the periphery of this shaft section. Within the lower part of this take-up sleeve is arranged an internal gear rim 641 which meshes with an intermediate idler gear pinion 651 on the upper driven shaft section 601 which in turn meshes with a driven gear wheel 591 coupled with the upper end of the adjusting shaft 561 as in the construction shown in Fig. 1. Between the take-up sleeve and the upper driven shaft sections are arranged adjustable stop means for limiting the automatic expansion of the working diameter of the cutter head which means are similar to those shown in Fig. 1 and comprise a stop collar or sleeve 711 provided with a circumferentially adjustable stop 701 adapted to engage a relatively fixed stop 691 on the upper driven shaft section 601, and means for setting the stop collar circumferentially relative to the take-up sleeve consisting of one or more locking pins 721 arranged on the stop collar and adapted to be engaged with one or another of an annular row of notches 731 on the periphery of the take-up sleeve 74 for setting the point at which the cutter bits cease to move outwardly any further and thus arrest the further cutting operation of the tool similar to that described with reference to the construction shown in Fig. 1.

The numeral 77 represents a tension sleeve surrounding the take-up sleeve and capable of rotary and longitudinal movement relative to one another but held against complete separation by a screw 78 on the tension sleeve engaging a wide annular groove 79 in the periphery of the take-up sleeve.

Between the upper part of the take-up sleeve and the upper driven shaft section is arranged an automatic take-up spring 80 of helical form the lower end of which has an inwardly projecting hook 81 engaging with a recess 82 in the upper driven shaft section and the upper end of which is provided with an outwardly projecting hook 83 which engages with an opening 84 in the upper part of the tension sleeve and also is adapted to engage with one or another of an annular series of notches 85 in the upper end of the take-up sleeve. By sliding the tension sleeve upwardly sufficiently to disengage the upper hook 83 from the respective notch 85 the take-up sleeve may be turned backwardly relatively to the upper driven shaft section until the take-up spring has been wound up to secure the desired tension, after which this spring may be held in this relative position by again lowering the take-up sleeve and engaging the upper hook of the take-up spring with the adjacent notch 85.

When the cutter head is inserted into the bore of the work piece the take-up sleeve is turned backwardly sufficiently to cause the gearing and adjusting rod or shaft 561 and the cones associated therewith, as in Fig. 1, to retract the cutter units and permit the latter to enter the bore of the work piece after which the take-up sleeve is released so that the take-up spring 80 can turn the take-up sleeve forwardly sufficiently to engage the bits with the bore of the work piece and cause these bits to remove stock from this bore while the cutter head is rotating at this time. The cutter units continue to expand automatically under the action of the spring 80 until the relatively movable stop 701 engages the relatively stationary stop 691 when the further expansion of the cutter ceases inasmuch as the cutting of the bore has been accomplished up to the particular diameter for which the tool has been set.

If the bore is to be further increased further setting of the tool for this purpose is necessary. For the purpose of holding the cutter units conveniently in their retracted or small diameter position while inserting the cutter head into the bore of the work piece a detent device is provided which may consist of a detent catch 86 movable radially on the upper part of the tension sleeve and yieldingly held by a spring 87 in its outward position and adapted to be pushed manually inwardly for engaging this catch with one or another of an annular row of notches 88 on the exterior of the upper driven shaft section. After the cutter head has been inserted in the bore of the work piece the detent catch 86 is released and disengaged by the spring 87 from the upper driven shaft section so as to uncouple the take-up sleeve from this upper driven shaft section and permit the take-up spring 80 to automatically feed the cutter units outwardly as the cutting operation on the work piece progresses.

In the modified form of this invention, as shown in Figs. 10, 11 and 12, no separate holder is employed for supporting the bits but instead the cutting bits 89 are formed integrally with a blade or base 90 on the outer side thereof. This base has the form of a longitudinal bar slidable radially in guideways 91 formed in the cutter body 92 and is sufficiently wide to project into the bore 93 of the same. At its opposite ends each cutter bit bar 90 is provided with inclined faces 94, 95 which engage with the upper and lower cones 431, 441 of the bit adjusting mechanism which latter is constructed and operates like that shown in Figs. 1 and 8. Upon turning the adjusting screw 451 so that the small ends of the cones approach each other the wedge action of the same against the inclines of the bit carriers 90 will cause the latter to move outwardly and increase the working diameter of the tool. Upon turning the adjusting screw in the opposite direction the cones will be separated by the spring 491 and the bit carriers 90 will be moved inwardly by the contracting springs 401 surrounding the cutter body and engaging with the outer sides of the bit carriers at opposite ends thereof. The driving of the body in this organization is effected by a shaft of which the lower section 531 is connected by a universal joint 551 with the upper end of the cutter body and the adjusting screw 451 is turned by means which include an adjusting shaft 561 connected by a universal joint 571 with this screw, thereby permitting the cutter head to assume an angular position relative to the driving shaft and adjusting shaft and still enable the cutter head to operate properly.

In the construction shown in Figs. 10, 11 and 12, each of the cutter blades 90 rests with its inner front corner 901 on the adjusting cones 431, 441 slightly in advance of a radial line 11—11 drawn through the axis of rotation of the body 92 and the foremost part 27 of each cutting bit is normally arranged slightly in front of this radial line. If the guideway 91 on the body 92 for the respective cutter blade is of such width that the blade is capable of a slight play therein then this blade upon engagement of its bits 89 with the working surface will be tipped backwardly and caused to turn with its inner front corner on the cones 441, 431, as an axis whereby the foremost part 27 of the cutting edge of the bits will be moved backwardly and inwardly. This will shorten the distance from the foremost part 27 of the cutting bits and prevent the same from digging into the material and possibly tearing the same, hanging up the tool or wrecking the same which otherwise would be liable to occur if the cutter blade were fulcrumed by engagement of its inner rear corner 902 with the cones 441, 431 because in the latter case the foremost part of the bits would move backwardly and outwardly and lengthen the distance between the axis of the body 92 and the foremost part of the bit.

Instead of making the front cutting side of the bits of semi-circular form, as shown in Fig. 4, the same may be varied. For instance, as shown in Fig. 14, each bit may be provided with a curved front side having a convex cutting edge 96, two flat parallel lateral sides 97 and a flat rear side 98. Another form of bit coming within this invention is shown in Fig. 15 in which instance each bit is provided with a straight front side having a transverse straight cutting edge 99, a transverse rear side 100, two parallel lateral faces 101 extending forwardly from opposite ends of the rear side, and two inclined faces 102 converging forwardly from the lateral parallel faces 101 to opposite ends of the front cutting face 99.

In all of the several forms of bits shown herein which embody this invention each bit effects a shearing cutting action while rotating and while traversing lengthwise of the axis of the tool.

Grinding of the outer faces 28 of the cutter bits so that they work in accordance with this invention may be effected by various means. For example, the bits of the holder blades shown in Figs. 10, 11 and 12 may be supported while being ground by a fixture which is constructed as follows and shown in Fig. 16:—

The numeral 103 represents a rotary body provided on its periphery with a plurality of radial seats 104, which in the present case are three in number and spaced equidistant. A blade or base 90 is secured with its front side to each of these radial seats by a clamping block 105 bearing against the rear side of the respective blade and held in place by screw means 106 connecting this block with the supporting body 103. The several bits 89 of the holders project beyond the body 103 and the foremost parts of the cutting edges 27 of the bits are arranged on radial lines relative to the axis of rotation of the body 103, and the outer faces 28 of the bits are all ground off concentrically with the axis of the fixture body 103, as shown in Fig. 16, by rotating the latter so that the outer ends of the several bits are ground off on a circular line 110 which is concentric with the axis of the body 103 by a grinding device of any suitable character. These cutter blades are now transferred from the fixture body and mounted in the body 92 so that the front sides of the blades 90 engage with the front sides of the guideways 91 so that the foremost part of the cutting edge 27 of each bit is located slightly in front of a radial line from the axis of the tool body 92, as shown in Fig. 12. When the bits and their supporting blades are thus mounted on the tool body the curved face 28 on the outer end of each bit is now eccentric to the axis of the tool body 92 and the heel 107 at the rear end of this face is separated by a clearing 108 from a circular line 109 which is concentric with the axis of the body 92 and intersects with the outer front corners of the bits 89.

If desired the blade 90 may be secured in the grinding fixture body 103 so that the foremost part of the cutting edge 27 and the front side of the blade are approximately in line with the radius of the fixture body, that is to say, the front side of the cutter bit and blade may be slightly in rear of a radial line from the axis of said fixture body, but in no case in front of this line.

It is to be understood that the distance which the front side of the bits are set on the tool body in advance of a radial line is governed by the diameter of the hole which is to be bored. For illustration, the bits for boring a four inch hole should preferably be set so that their front ends are one-sixteenth of an inch ahead of a radial line of the tool body under which conditions a cutter blade and its bits having a thickness of one-half inch will provide a clearance of .009 of an inch between the heel and cutting line at the front of each of these bits.

In this tool the depth of cut of the bits is controlled by the amount of clearance which formed on the outer face of the bits and the distance which the foremost part of the bit is set ahead of a radial line running from the axis of rotation of the tool body while the tool is in operation.

The means herein shown for mounting the cutter units on the body of the cutter head, moving the same radially for different diameters of working surfaces, driving the cutter head, adjusting the cutter units from a point remote to the working surfaces, and effecting manual, semi-automatic and/or wholly automatic adjustment of the cutter units is set forth in detail in U. S. Patents Nos. 1,610,681 and 1,689,589 and in U. S. Patent applications Ser. Nos. 77,430—92,118 —180,159 and these may be referred to for a more complete illustration and explanation as to the construction and mode of operation of the respective features disclosed therein.

I claim as my invention:

A reciprocating and rotating cutting device comprising a rapidly reciprocable and rotatable body, a cutting blade mounted for radial adjustment on said body and having a plurality of bits or teeth arranged in a longitudinal row on its outer edge, said row being parallel with the axis of rotation of said body, each tooth provided with a front cutting or leading edge and an outer face which recedes from said leading edge to the heel or trailing edge of bit or tooth and is formed to remove thin chips from the surface being cut as the rotating body is rapidly reciprocated back and forth along said surface, and wedge adjusting means mounted for longitudinal floating movement on said body and engaged by the inner edge of said blade and positively holding said blade against inward movement and being adapted to be shifted lengthwise by the latter as the blade tilts upon engaging the bore of the cylindrical surface which is being operated upon, said wedge means also permitting relative movement between said cutting edges and permitting said row to toe in in the direction of movement of the reciprocating body.

MARSDEN C. HUTTO.